United States Patent
Zhang et al.

(10) Patent No.: US 11,878,476 B2
(45) Date of Patent: Jan. 23, 2024

(54) COMPOSITE ARTICLE AND METHOD OF FORMING A COMPOSITE ARTICLE

(71) Applicant: SAINT-GOBAIN PERFORMANCE PLASTICS CORPORATION, Solon, OH (US)

(72) Inventors: Jianfeng Zhang, Shrewsbury, MA (US); Scott R. Johnson, Troy, NY (US); Heidi Lennon, Shrewsbury, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 87 days.

(21) Appl. No.: 17/348,387

(22) Filed: Jun. 15, 2021

(65) Prior Publication Data
US 2021/0394459 A1    Dec. 23, 2021

Related U.S. Application Data

(60) Provisional application No. 63/041,529, filed on Jun. 19, 2020.

(51) Int. Cl.
*B29C 65/00* (2006.01)
*B29C 65/56* (2006.01)
(Continued)

(52) U.S. Cl.
CPC ........... *B29C 66/712* (2013.01); *B29C 65/56* (2013.01); *B29C 66/028* (2013.01); *B29K 2669/00* (2013.01); *B29K 2683/00* (2013.01)

(58) Field of Classification Search
CPC ..... B29C 66/712; B29C 66/71; B29C 65/004; B29C 65/8261; B29C 66/61;
(Continued)

(56) References Cited

U.S. PATENT DOCUMENTS

| 3,597,569 A | 8/1971 | Gerber |
| 4,039,798 A | 8/1977 | Lythall et al. |

(Continued)

FOREIGN PATENT DOCUMENTS

| CA | 2116433 C | 12/2004 |
| CA | 2461223 C | 5/2013 |

(Continued)

OTHER PUBLICATIONS

CJan Fluid Technology, 2017, "The Differences Between Silicone and PVC", https://web.archive.org/web/20170922114948/http://www.cjanfluid.com/blog/the-differences-between-silicone-and-pvs.html, 3 pages.

(Continued)

*Primary Examiner* — Monica A Huson
(74) *Attorney, Agent, or Firm* — Abel Schillinger, LLP; Chi Suk Kim

(57) ABSTRACT

The present disclosure relates to a composite article that may include a plastic component, and a silicone component bonded the plastic component. The plastic component and the silicone component may be bonded at an intersecting region between a first surface of the plastic component and a first surface of the silicone component. The intersecting region may include at least one of an acetone content of not greater than about 0.2 ppm, an MEK content of not greater than about 0.2 ppm, or a trimethylsilanol content of not greater than about 0.2 ppm.

19 Claims, 4 Drawing Sheets

(51) Int. Cl.
    *B29K 683/00* (2006.01)
    *B29K 669/00* (2006.01)
(58) Field of Classification Search
    CPC .............. B29C 66/5326; B29C 66/028; B29C
              66/1122; B29C 66/7392; B29C 65/56;
              B29K 2083/00; B29K 2023/00; B29K
          2033/12; B29K 2023/12; B29K 2067/003;
              B29K 2069/00; B29K 2683/00; B29K
                          2669/00; B29L 2031/56
    See application file for complete search history.

(56) References Cited

U.S. PATENT DOCUMENTS

| | | | |
|---|---|---|---|
| 4,516,971 | A | 5/1985 | Spencer |
| RE32,056 | E | 12/1985 | Granzow et al. |
| 4,610,670 | A | 9/1986 | Spencer |
| 4,793,880 | A | 12/1988 | Shaposka et al. |
| 4,913,756 | A | 4/1990 | Shaposka et al. |
| 5,521,351 | A | 5/1996 | Mahoney |
| 5,801,489 | A | 9/1998 | Chism, Jr. et al. |
| 5,858,016 | A | 1/1999 | Bacehowski et al. |
| 6,000,436 | A | 12/1999 | Auvil et al. |
| 6,228,204 | B1 | 5/2001 | Reinhardt et al. |
| 6,270,860 | B1 | 8/2001 | Nakata et al. |
| 6,299,596 | B1 | 10/2001 | Ding |
| 6,468,482 | B1 | 10/2002 | Frieze et al. |
| 6,664,499 | B1 | 12/2003 | Brink et al. |
| 7,226,649 | B2 | 6/2007 | Shang et al. |
| 7,329,608 | B2 | 2/2008 | Babayan et al. |
| 7,442,271 | B2 | 10/2008 | Asmussen et al. |
| 7,754,816 | B2 | 7/2010 | Snider |
| 8,613,367 | B2 | 12/2013 | Ou et al. |
| 8,975,163 | B1 | 3/2015 | Lei et al. |
| 9,550,015 | B2 | 1/2017 | Gray |
| 10,081,135 | B2 | 9/2018 | Patil et al. |
| 10,195,416 | B2 | 2/2019 | Gebauer et al. |
| 10,550,966 | B2 | 2/2020 | Blomberg |
| 11,441,716 | B2 | 9/2022 | Tamaribuchi et al. |
| 2002/0172780 | A1 | 11/2002 | Halverson |
| 2003/0015816 | A1 | 1/2003 | Rapacki et al. |
| 2003/0102293 | A1 | 6/2003 | Therond |
| 2003/0195609 | A1 | 10/2003 | Berenstein et al. |
| 2003/0196418 | A1 | 10/2003 | O'Brien et al. |
| 2004/0016504 | A1 | 1/2004 | Mitarai |
| 2004/0067705 | A1* | 4/2004 | Ton-That ................ B32B 27/08 442/65 |
| 2004/0144492 | A1 | 7/2004 | Ikeda et al. |
| 2005/0017505 | A1 | 1/2005 | Thilly |
| 2005/0090797 | A1 | 4/2005 | Almasian et al. |
| 2005/0252608 | A1 | 11/2005 | MacDonald |
| 2006/0070677 | A1 | 4/2006 | Inoue et al. |
| 2006/0081567 | A1 | 4/2006 | Dougherty, Sr. et al. |
| 2006/0191623 | A1 | 8/2006 | Lutz et al. |
| 2006/0284417 | A1 | 12/2006 | Brown |
| 2007/0118225 | A1 | 5/2007 | Hestad et al. |
| 2007/0142960 | A1 | 6/2007 | Bollinger et al. |
| 2008/0009833 | A1 | 1/2008 | Corbin et al. |
| 2008/0202669 | A1 | 8/2008 | Zemmouri et al. |
| 2008/0257604 | A1 | 10/2008 | Becker et al. |
| 2008/0277926 | A1 | 11/2008 | Inman, Jr. et al. |
| 2011/0171480 | A1 | 7/2011 | Mori et al. |
| 2011/0220290 | A1 | 9/2011 | Hlavinka et al. |
| 2013/0158189 | A1 | 6/2013 | Reneirs et al. |
| 2014/0004503 | A1 | 1/2014 | Cima et al. |
| 2014/0077488 | A1 | 3/2014 | Wegener et al. |
| 2014/0197141 | A1 | 7/2014 | Dorey et al. |
| 2014/0263202 | A1 | 9/2014 | Partridge |
| 2014/0283940 | A1 | 9/2014 | Bourgeois et al. |
| 2014/0314818 | A1 | 10/2014 | Giare-Patel et al. |
| 2016/0109052 | A1 | 4/2016 | Yodogawa et al. |
| 2016/0146392 | A1 | 5/2016 | Pennock et al. |
| 2016/0200038 | A1 | 7/2016 | Gagne et al. |
| 2016/0235962 | A1 | 8/2016 | Gebauer |
| 2017/0107345 | A1 | 4/2017 | Kon et al. |
| 2017/0141001 | A1 | 5/2017 | Sakiyama et al. |
| 2017/0221856 | A1 | 8/2017 | Yamauchi |
| 2017/0326584 | A1* | 11/2017 | Lennon .................. C08K 3/013 |
| 2018/0161554 | A1 | 6/2018 | Takemoto |
| 2018/0320026 | A1 | 11/2018 | De Beer |
| 2019/0048230 | A1 | 2/2019 | Hahnel |
| 2019/0105849 | A1 | 4/2019 | Schwalm et al. |
| 2019/0134243 | A1 | 5/2019 | Nelson et al. |
| 2019/0284443 | A1 | 9/2019 | Sherman et al. |
| 2019/0313863 | A1 | 10/2019 | Laundre |
| 2020/0071199 | A1 | 3/2020 | Lewis, III |
| 2021/0001563 | A1 | 1/2021 | Zhang et al. |
| 2021/0001566 | A1 | 1/2021 | Zhang et al. |
| 2021/0076480 | A1 | 3/2021 | Ikedo et al. |
| 2021/0178506 | A1 | 6/2021 | Zhang et al. |
| 2021/0199226 | A1 | 7/2021 | Zhang et al. |
| 2021/0291291 | A1 | 9/2021 | Zhang et al. |

FOREIGN PATENT DOCUMENTS

| | | |
|---|---|---|
| CN | 1695844 A | 11/2005 |
| CN | 101579757 A | 11/2009 |
| CN | 102061440 A | 5/2011 |
| CN | 102159868 A | 8/2011 |
| CN | 105065804 A | 11/2015 |
| CN | 106795343 A | 5/2017 |
| CN | 206140944 U | 5/2017 |
| CN | 108127239 A | 6/2018 |
| DE | 102011010905 A1 | 8/2012 |
| DE | 102016003862 A | 12/2017 |
| EP | 0064288 A1 | 11/1982 |
| EP | 0479592 A2 | 4/1992 |
| EP | 1445209 B1 | 5/2008 |
| EP | 1656414 B1 | 10/2013 |
| FR | 2793178 A1 | 11/2000 |
| JP | 5042203 A | 2/1993 |
| JP | 6155582 A | 6/1994 |
| JP | H05456 A | 6/1994 |
| JP | 7251456 A | 10/1995 |
| JP | H0861581 A | 3/1996 |
| JP | H0955287 A | 2/1997 |
| JP | H09135881 A | 5/1997 |
| JP | 2000279509 A | 10/2000 |
| JP | 2006124665 A | 5/2006 |
| JP | 2009028922 A | 2/2009 |
| JP | 2013132822 A | 7/2013 |
| JP | 2018015904 A1 | 2/2018 |
| JP | 2019052716 A | 4/2019 |
| KR | 20030043478 A | 6/2003 |
| KR | 20150054280 A | 5/2015 |
| KR | 101708024 B1 | 2/2017 |
| KR | 20190117741 A | 10/2019 |
| TW | 201510402 A | 3/2015 |
| WO | 2015075040 A1 | 5/2015 |
| WO | 2018146880 A1 | 8/2018 |
| WO | 2019130223 A1 | 7/2019 |
| WO | 2021003243 A1 | 1/2021 |
| WO | 2021003244 A1 | 1/2021 |
| WO | 2021118780 A1 | 6/2021 |
| WO | 2021133677 A1 | 7/2021 |
| WO | 2021188261 A1 | 9/2021 |

OTHER PUBLICATIONS

International Search Report and Written Opinion for PCT/US2020/040455, dated Oct. 22, 2020, 10 pages.
International Search Report and Written Opinion for PCT/US2020/040454, dated Oct. 15, 2020, 11 pages.
International Search Report and Written Opinion for PCT US2020/061198, dated Mar. 12, 2021, 9 pages.
International Search Report and Written Opinion for PCT/US2020/066066, dated Apr. 7, 2021, 10 pages.
International Search Report and Written Opinion for PCT/US2021/019197, dated Jun. 11, 2021, 9 pages.
Kinney, Shawn D. et al., Thermoplastic Tubing Welders and Sealers: Forging the Future of Disposable Technologies In the Biopharmaceutical Industry, BioProcess International, May 2007, pp. 52-61.

(56) References Cited

OTHER PUBLICATIONS

TSCD-Q Sterile Tubing Welder, Discover Polyurethane Tubing Connections based on Proven Terumo BCT Technology, Terumo BCT, Inc., 2014, 6 pages.
SCD IIB, Sterile Tubing Welder, Experience Fast, Easy, Reliable Welds, Terumo BCT, Inc., 2014, 6 pages.
CPC, Comparison Guide: Tube Welders and Aseptic Connectors, Technical Guide 7009, Colder Products Company, 2018, 3 pages.
Annunziata, Marco et al., "Bacterial inactivation/sterilization by argon plasma treatment on contaminated titanium implant surfaces: In vitro study," Med Oral Patol Oral Cir Bucal. (2015), doi:10.4317/medoral.20845, 4 pages.
International Search Report and Written Opinion for PCT/US2021/037442, dated Oct. 7, 2021, 9 pages.

* cited by examiner

COMPOSITE ARTICLE AND METHOD OF FORMING A COMPOSITE ARTICLE

CROSS-REFERENCE TO RELATED APPLICATION(S)

This application claims priority under 35 U.S.C. § 119(e) to U.S. Provisional Application No. 63/041,529, entitled "COMPOSITE ARTICLE AND METHOD OF FORMING A COMPOSITE ARTICLE," by Jianfeng ZHANG et al., filed Jun. 19, 2020, which is assigned to the current assignee hereof and incorporated herein by reference in its entirety.

FIELD OF THE DISCLOSURE

The present disclosure relates to a composite article and, more particularly, a composite article formed using a primer free forming method.

BACKGROUND

The lamination of silicone materials with plastic layers can be useful for various applications. However, known lamination processes are complicated by the fact that silicone does not generally adhere well to plastic layers. Further, known lamination processes produce contamination within the laminated silicone, in particular, at the intersection between the silicone material and the plastic layer. Such contamination diminishes the usefulness of the laminated silicone material. Accordingly, there remains a need for laminated silicon composite articles that have high adhesion between any layers of the composite article and minimal contamination from the lamination process.

SUMMARY

According to a first aspect, a composite article may a plastic component, and a silicone component bonded the plastic component. The plastic component and the silicone component may be bonded at an intersecting region between a first surface of the plastic component and a first surface of the silicone component. The intersecting region may include at least one of an acetone content of not greater than about 0.2 ppm, an MEK content of not greater than about 0.2 ppm, or a trimethylsilanol content of not greater than about 0.2 ppm.

According to another aspect, a method for forming a composite structure may include providing a plastic component, applying a plasma surface treatment to a first surface of the plastic component, providing a silicone component, and compressing the plastic component and the silicone component together to form the composite structure where the first surface of the plastic component contacts a first surface of the silicone component.

According to still another aspect, a method for forming a composite structure may include providing a plastic component, providing a silicone component, applying a plasma surface treatment to a first surface of the silicone component, and compressing the plastic component and the silicone component together to form the composite structure where a first surface of the plastic component contacts the first surface of the silicone component.

According to yet another aspect, a method for forming a composite structure may include providing a plastic component, applying a plasma surface treatment to a first surface of the plastic component, providing a silicone component, applying a plasma surface treatment to a first surface of the silicone component, and compressing the plastic component and the silicone component together to form the composite structure where the first surface of the plastic component contacts the first surface of the silicone component.

BRIEF DESCRIPTION OF THE DRAWINGS

Embodiments are illustrated by way of example and are not limited to the accompanying figures.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a composite article that includes a plastic component and a silicone component bonded to the plastic component at an intersecting region between a first surface of the plastic component and a first surface of the silicone component. Further embodiments described herein are generally directed to methods of forming the composite article.

Figure 1:
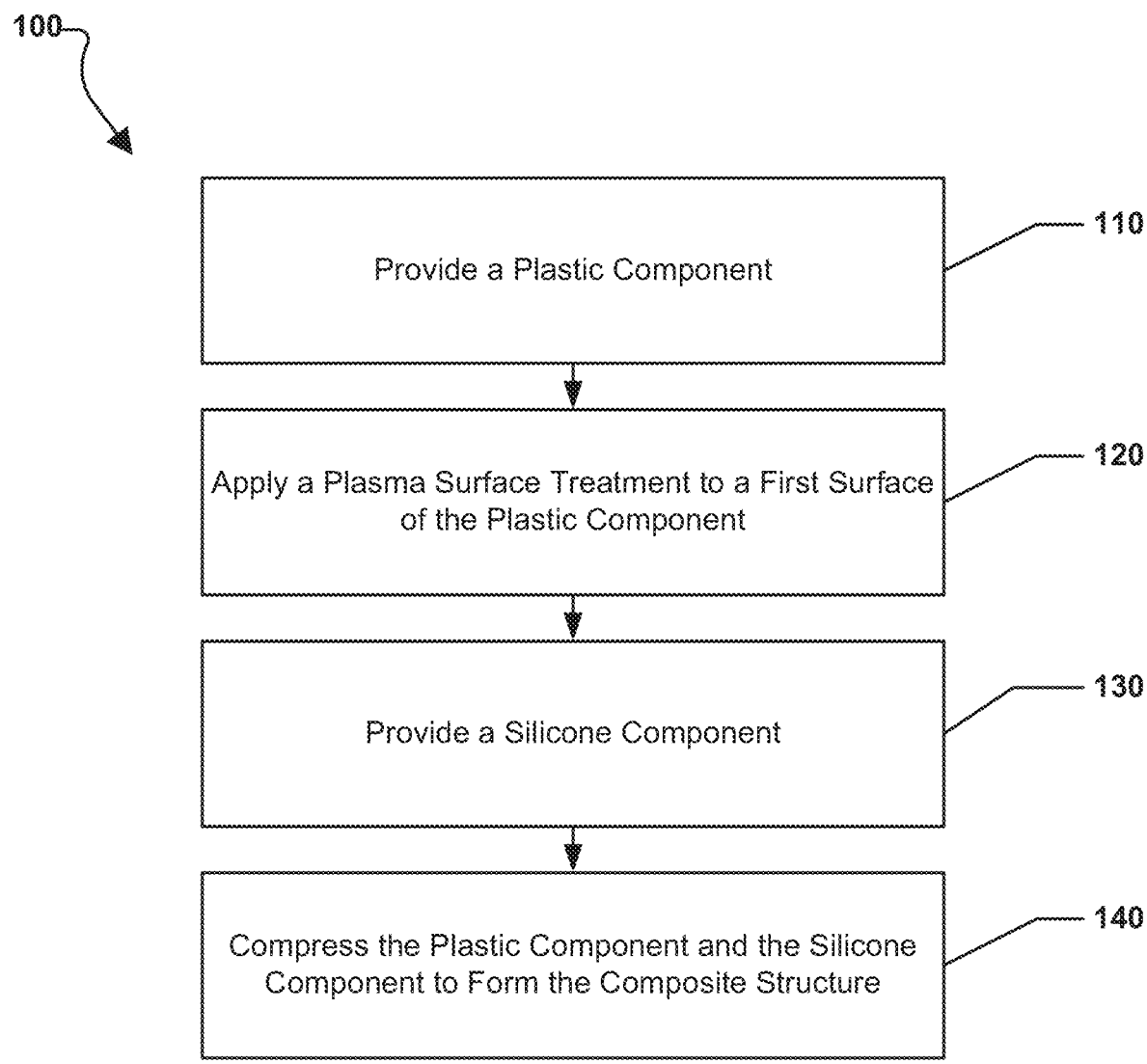
FIG. 1 includes a flow chart showing a method for forming a composite structure according to embodiments described herein.

Referring first to a method of forming a composite article as described herein, FIG. 1 includes a diagram showing a forming method 100 according to embodiments described herein for forming a composite article. According to particular embodiments, the forming method 100 may include a first step 110 of providing a plastic component, a second step 120 of applying a plasma surface treatment to a first surface of the plastic component, a third step 130 of providing a silicone component, and a fourth step 140 of compressing the plastic component and the silicone component together to form the composite structure wherein the first surface of the plastic component contacts a first surface of the silicone component.

According to particular embodiments, the first step 110 of providing the plastic component may include any particular method of forming a plastic component. For example, the first step 110 of providing the plastic component may include extruding the plastic component. According to still other embodiments, the first step 110 of providing the plastic component may include molding the plastic component.

According to certain embodiments, the plastic component provided in the first step 110 may include a particular material. For example, the plastic component may include a polyolefin. According to still other embodiments, the plastic component may include a polypropylene material. According to yet other embodiments, the plastic component may include a polyethylene terephthalate (PET) material. According to yet other embodiments, the plastic component may include a poly(methyl methacrylate) (PMMA) material. According to still other embodiments, the plastic component may include any combination of a polypropylene material, a PET material, and a PMMA material. According to certain embodiments, the plastic component may consist of a particular material. For example, the plastic component may consist of a polyolefin. According to still other embodiments, the plastic component may consist of a polypropylene material. According to yet other embodiments, the plastic component may consist of a polyethylene terephthalate (PET) material. According to yet other embodiments, the plastic component may consist of a poly(methyl methacrylate) (PMMA) material. According to still other embodiments, the plastic component may consist of any combination of a polypropylene material, a PET material, and a PMMA material.

According to certain embodiments, the plastic component provided in the first step 110 may include a particular fluoropolymer material. For example, the plastic component may include a fluorinated ethylene propylene (FEP) material. According to yet other embodiments, the plastic component may include a polytetrafluoroethylene (PTFE) material. According to still other embodiments, the plastic component may include any combination of a fluoropolymer material, a FEP material, and a PTFE material. According to certain embodiments, the plastic component may consist of a particular fluoropolymer material. For example, the plastic component may consist of a fluorinated ethylene propylene (FEP) material. According to yet other embodiments, the plastic component may consist of a polytetrafluoroethylene (PTFE) material. According to still other embodiments, the plastic component may consist of any combination of a fluoropolymer material, a FEP material, and a PTFE material.

According to still other embodiments, the plastic component provided in the first step 110 may include a polycarbonate material. According to yet other embodiments, the plastic component may consist of a polycarbonate.

According to other particular embodiments, the second step 120 of applying the plasma surface treatment to a first surface of the plastic component may include applying a plasma configured to activate, or reactivate, functional groups on the first surface of the plastic component.

According to still other embodiments, the second step 120 of applying the plasma surface treatment may include applying a plasma for a particular duration. For example, the second step 120 of applying the plasma surface treatment may include applying a plasma for a duration of not greater than about 5 min or not greater than about 1 min or not greater than about 30 seconds of not greater than about 15 seconds or not greater than about 10 seconds or not greater than about 5 seconds. It will be appreciated that the second step 120 of applying the plasma surface treatment may include applying a plasma for a duration within a range between any of the values noted above. It will be further appreciated that the second step 120 of applying the plasma surface treatment may include applying a plasma for a duration of any value between any of the values noted above.

According to still other embodiments, the third step 130 of providing the silicone component may include any particular method of forming the silicone component. For example, the third step 130 of providing the silicone component may include extruding the silicone component. According to still other embodiments, the third step 130 of providing a silicone component may include molding the silicone component.

According to yet other embodiments, the fourth step 140 of compressing the plastic component and the silicone component together may occur within a particular time period after the plasma surface treatment of to the first surface of the plastic component. For example, compression of the plastic component and the silicone component together may occur not greater than about 30 seconds after the plasma surface treatment to the first surface of the plastic component, such as, not greater than about 25 seconds after the plasma surface treatment to the first surface of the plastic component or not greater than about 20 seconds after the plasma surface treatment to the first surface of the plastic component or not greater than about 15 seconds after the plasma surface treatment to the first surface of the plastic component or not greater than about 10 seconds after the plasma surface treatment to the first surface of the plastic component or even not greater than about 5 seconds after the plasma surface treatment to the first surface of the plastic component. It will be appreciated that the fourth step 140 of compressing the plastic component and the silicone component together may occur within a range between any of the values noted above. It will be further appreciated that the fourth step 140 of compressing the plastic component and the silicone component together may occur between any of the values noted above.

Referring now to the composite structure formed according to the forming method 100, the composite structure may include a plastic component, and a silicone component bonded to the plastic component at an intersecting region between a first surface of the plastic component and a first surface of the silicone component.

According to certain embodiments, the plastic component of the composite structure formed according to the forming method 100 may include a particular material. For example, the plastic component may include a polyolefin. According to still other embodiments, the plastic component may include a polypropylene material. According to yet other embodiments, the plastic component may include a polyethylene terephthalate (PET) material. According to yet other embodiments, the plastic component may include a poly(methyl methacrylate) (PMMA) material. According to still other embodiments, the plastic component may include any combination of a polypropylene material, a PET material, and a PMMA material. According to certain embodiments, the plastic component may consist of a particular material. For example, the plastic component may consist of a polyolefin. According to still other embodiments, the plastic component may consist of a polypropylene material. According to yet other embodiments, the plastic component may consist of a polyethylene terephthalate (PET) material. According to yet other embodiments, the plastic component may consist of a poly(methyl methacrylate) (PMMA) material. According to still other embodiments, the plastic component may consist of any combination of a polypropylene material, a PET material, and a PMMA material.

According to certain embodiments, the plastic component of the composite structure formed according to the forming method 100 may include a particular material. For example, the plastic component may include a fluorinated ethylene propylene (FEP) material. According to yet other embodiments, the plastic component may include a polytetrafluoroethylene (PTFE) material. According to still other embodiments, the plastic component may include any combination of a fluoropolymer material, a FEP material, and a PTFE material. According to certain embodiments, the plastic component may consist of a particular fluoropolymer material. For example, the plastic component may consist of a fluorinated ethylene propylene (FEP) material. According to yet other embodiments, the plastic component may consist of a polytetrafluoroethylene (PTFE) material. According to still other embodiments, the plastic component may consist of any combination of a fluoropolymer material, a FEP material, and a PTFE material.

According to still other embodiments, the plastic component of the composite structure formed according to the forming method 100 may include a particular material. According to yet other embodiments, the plastic component may consist of a polycarbonate.

According to yet other embodiments, the composite structure formed according to the forming method 100 may have a particular adhesion force between the silicone component and the plastic component. For purposes of embodiments described herein, adhesion force can be measured using ASTM D1876-08. According to certain embodiments, the adhesion force between the silicone component and the plastic component may be at least about 1 ppi, such as, at least about 5 ppi or at least about 15 ppi or even at least about 50 ppi. It will be appreciated that the adhesion force between the silicone component and the plastic component may be within a range between any of the values noted above. It will be further appreciated that the adhesion force between the silicone component and the plastic component may be any value between any of the values noted above.

According to still other embodiments, the intersection region between the silicone component and the plastic component of the composite structure formed according to the forming method 100 may have a minimal content of acetone. For purposes of embodiments described herein, acetone content of the intersection region can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the acetone content of the intersection region may be not greater than about 0.2 ppm. According still other embodiments, the intersection region may be substantially free of acetone.

According to still other embodiments, the composite structure formed according to the forming method 100 may have a minimal content of acetone. For purposes of embodiments described herein, acetone content of the composite article can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the acetone content of the composite article may be not greater than about 0.2 ppm. According still other embodiments, the composite article may be substantially free of acetone.

According to still other embodiments, the intersection region between the silicone component and the plastic component of the composite structure formed according to the forming method 100 may have a minimal content of methyl ethyl ketone (MEK). For purposes of embodiments described herein, the MEK content of the intersection region can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the MEK content of the intersection region may be not greater than about 0.2 ppm. According still other embodiments, the intersection region may be substantially free of MEK.

According to still other embodiments, the composite structure formed according to the forming method 100 may have a minimal content of MEK. For purposes of embodiments described herein, the MEK content of the composite article can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the MEK content of the composite article may be not greater than about 0.2 ppm. According still other embodiments, the composite article may be substantially free of MEK.

According to still other embodiments, the intersection region between the silicone component and the plastic component of the composite structure formed according to the forming method 100 may have a minimal content of trimethylsilanol. For purposes of embodiments described herein, the trimethylsilanol content of the intersection region can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the trimethylsilanol content of the intersection region may be not greater than about 0.2 ppm. According still other embodiments, the intersection region may be substantially free of trimethylsilanol.

According to still other embodiments, the composite structure formed according to the forming method 100 may have a minimal content of trimethylsilanol. For purposes of embodiments described herein, the trimethylsilanol content of the composite article can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the trimethylsilanol content of the composite article may be not greater than about 0.2 ppm. According still other embodiments, the composite article may be substantially free of trimethylsilanol.

According to yet other embodiments, the composite structure formed according to the forming method 100 may have a particular thickness. For example, the composite structure may have an average thickness of at least about 2 mils, such as, at least about 3 mils or at least about 4 mils or at least about 5 mils or at least about 6 mils or at least about 7 mils or at least about 8 mils or at least about 9 mils or even at least about 10 mils. According to yet other embodiments, the composite structure may have an average thickness of not greater than about 500 mils. It will be appreciated that the thickness of the composite structure may be within a range between any of the minimum and maximum values noted above. It will be further appreciated that the thickness of the composite structure may be any value between any of the minimum and maximum values noted above.

According to yet other embodiments, the silicone component of the composite structure formed according to the forming method 100 may have a particular thickness. For example, the silicone component may have an average thickness of at least about 0.1 mils, such as, at least about 0.2 mils or at least about 0.5 mils or at least about 1.0 mils or at least about 2.0 mils or at least about 3.0 mils or at least about 4.0 mils or even at least about 5.0 mils. According to yet other embodiments, the silicone component may have an average thickness of not greater than about 250 mils. It will be appreciated that the thickness of the silicone component may be within a range between any of the minimum and maximum values noted above. It will be further appreciated that the thickness of the silicone component may be any value between any of the minimum and maximum values noted above.

According to yet other embodiments, the plastic component of the composite structure formed according to the forming method 100 may have a particular thickness. For example, the plastic component may have an average thickness of at least about 0.1 mils, such as, at least about 0.2 mils or at least about 0.5 mils or at least about 1.0 mils or at least about 2.0 mils or at least about 3.0 mils or at least about 4.0 mils or even at least about 5.0 mils. According to yet other embodiments, the plastic component may have an average thickness of not greater than about 250 mils. It will be appreciated that the thickness of the plastic component may be within a range between any of the minimum and maximum values noted above. It will be further appreciated that the thickness of the plastic component may be any value between any of the minimum and maximum values noted above.

Figure 2:
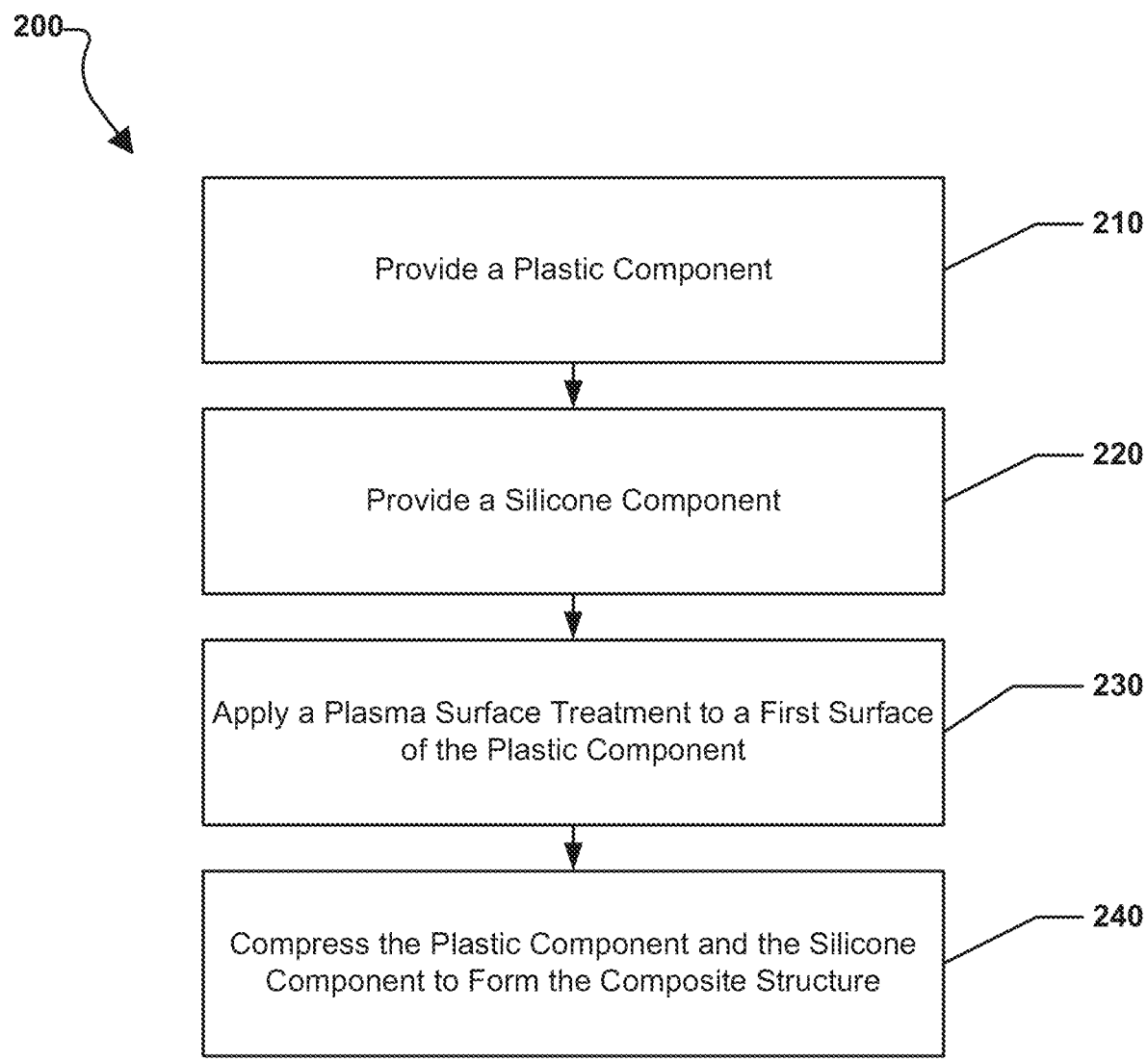
FIG. 2 includes a flow chart showing another method for forming a composite structure according to embodiments described herein.

Referring to another method of forming a composite article as described herein, FIG. 2 includes a diagram showing a forming method 200 according to embodiments described herein for forming a composite article. According to particular embodiments, the forming method 200 may include a first step 210 of providing a plastic component, a second step 220 of providing a silicone component, a third step 230 of applying a plasma surface treatment to a first surface of the silicone component, and a fourth step 240 of compressing the plastic component and the silicone component together to form the composite structure where the first surface of the plastic component contacts a first surface of the silicone component.

According to particular embodiments, the first step 210 of providing the plastic component may include any particular method of forming a plastic component. For example, the first step 210 of providing the plastic component may include extruding the plastic component. According to still other embodiments, the first step 210 of providing the plastic component may include molding the plastic component.

According to certain embodiments, the plastic component provided in the first step 210 may include a particular material. For example, the plastic component may include a polyolefin. According to still other embodiments, the plastic component may include a polypropylene material. According to yet other embodiments, the plastic component may include a polyethylene terephthalate (PET) material. According to yet other embodiments, the plastic component may include a poly(methyl methacrylate) (PMMA) material. According to still other embodiments, the plastic component may include any combination of a polypropylene material, a PET material, and a PMMA material. According to certain embodiments, the plastic component may consist of a particular material. For example, the plastic component may consist of a polyolefin. According to still other embodiments, the plastic component may consist of a polypropylene material. According to yet other embodiments, the plastic component may consist of a polyethylene terephthalate (PET) material. According to yet other embodiments, the plastic component may consist of a poly(methyl methacrylate) (PMMA) material. According to still other embodiments, the plastic component may consist of any combination of a polypropylene material, a PET material, and a PMMA material.

According to certain embodiments, the plastic component provided in the first step 210 may include a particular fluoropolymer material. For example, the plastic component may include a fluorinated ethylene propylene (FEP) material. According to yet other embodiments, the plastic component may include a polytetrafluoroethylene (PTFE) material. According to still other embodiments, the plastic component may include any combination of a fluoropolymer material, a FEP material, and a PTFE material. According to certain embodiments, the plastic component may consist of a particular fluoropolymer material. For example, the plastic component may consist of a fluorinated ethylene propylene (FEP) material. According to yet other embodiments, the plastic component may consist of a polytetrafluoroethylene (PTFE) material. According to still other embodiments, the plastic component may consist of any combination of a fluoropolymer material, a FEP material, and a PTFE material.

According to still other embodiments, the plastic component provided in the first step 210 may include a polycarbonate material. According to yet other embodiments, the plastic component may consist of a polycarbonate.

According to still other embodiments, the second step 220 of providing the silicone component may include any particular method of forming the silicone component. For example, the second step 220 of providing the silicone component may include extruding the silicone component. According to still other embodiments, the second step 220 of providing a silicone component may include molding the silicone component.

According to other particular embodiments, the third step 230 of applying the plasma surface treatment to a first surface of the silicone component may include applying a plasma configured to activate, or reactivate, functional groups on the first surface of the silicone component.

According to still other embodiments, the third step 230 of applying the plasma surface treatment may include applying a plasma for a particular duration. For example, the third step 230 of applying the plasma surface treatment may include applying a plasma for a duration of not greater than about 5 min or not greater than about 1 min or not greater than about 30 seconds of not greater than about 15 seconds or not greater than about 10 seconds or not greater than about 5 seconds. It will be appreciated that the third step 230 of applying the plasma surface treatment may include applying the plasma for a duration within a range between any of the values noted above. It will be further appreciated that the third step 230 of applying the plasma surface treatment may include applying the plasma for a duration of any value between any of the values noted above.

According to yet other embodiments, the fourth step 240 of compressing the plastic component and the silicone component together may occur within a particular time period after the plasma surface treatment of to the first surface of the plastic component. For example, compression of the plastic component and the silicone component together may occur not greater than about 30 seconds after the plasma surface treatment to the first surface of the plastic component, such as, not greater than about 25 seconds after the plasma surface treatment to the first surface of the plastic component or not greater than about 20 seconds after the plasma surface treatment to the first surface of the plastic component or not greater than about 15 seconds after the plasma surface treatment to the first surface of the plastic component or not greater than about 10 seconds after the plasma surface treatment to the first surface of the plastic component or even not greater than about 5 seconds after the plasma surface treatment to the first surface of the plastic component. It will be appreciated that the fourth step 240 of compressing the plastic component and the silicone component together may occur within a range between any of the values noted above. It will be further appreciated that the fourth step 240 of compressing the plastic component and the silicone component together may occur between any of the values noted above.

Referring now to the composite structure formed according to the forming method 200, the composite structure may include a plastic component, and a silicone component bonded to the plastic component at an intersecting region between a first surface of the plastic component and a first surface of the silicone component.

According to certain embodiments, the plastic component of the composite structure formed according to the forming method 200 may include a particular material. For example, the plastic component may include a polyolefin. According to still other embodiments, the plastic component may include a polypropylene material. According to yet other embodiments, the plastic component may include a polyethylene terephthalate (PET) material. According to yet other embodiments, the plastic component may include a poly(methyl methacrylate) (PMMA) material. According to still other embodiments, the plastic component may include any combination of a polypropylene material, a PET material, and a PMMA material. According to certain embodiments, the plastic component may consist of a particular material. For example, the plastic component may consist of a polyolefin. According to still other embodiments, the plastic component may consist of a polypropylene material. According to yet other embodiments, the plastic component may consist of a polyethylene terephthalate (PET) material. According to yet other embodiments, the plastic component may consist of a poly(methyl methacrylate) (PMMA) material. According to still other embodiments, the plastic component may consist of any combination of a polypropylene material, a PET material, and a PMMA material.

According to certain embodiments, the plastic component of the composite structure formed according to the forming method 200 may include a particular material. For example, the plastic component may include a fluorinated ethylene propylene (FEP) material. According to yet other embodiments, the plastic component may include a polytetrafluoroethylene (PTFE) material. According to still other embodiments, the plastic component may include any combination of a fluoropolymer material, a FEP material, and a PTFE material. According to certain embodiments, the plastic component may consist of a particular fluoropolymer material. For example, the plastic component may consist of a fluorinated ethylene propylene (FEP) material. According to yet other embodiments, the plastic component may consist of a polytetrafluoroethylene (PTFE) material. According to still other embodiments, the plastic component may consist of any combination of a fluoropolymer material, a FEP material, and a PTFE material.

According to still other embodiments, the plastic component of the composite structure formed according to the forming method 200 may include a particular material. According to yet other embodiments, the plastic component may consist of a polycarbonate.

According to yet other embodiments, the composite structure formed according to the forming method 200 may have a particular adhesion force between the silicone component and the plastic component. For purposes of embodiments described herein, adhesion force can be measured using ASTM D1876-08. According to certain embodiments, the adhesion force between the silicone component and the plastic component may be at least about 1 ppi, such as, at least about 5 ppi or at least about 15 ppi or even at least about 50 ppi. It will be appreciated that the adhesion force between the silicone component and the plastic component may be within a range between any of the values noted above. It will be further appreciated that the adhesion force between the silicone component and the plastic component may be any value between any of the values noted above.

According to still other embodiments, the intersection region between the silicone component and the plastic component of the composite structure formed according to the forming method 200 may have a minimal content of acetone. For purposes of embodiments described herein, acetone content of the intersection region can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the acetone content of the intersection region may be not greater than about 0.2 ppm. According still other embodiments, the intersection region may be substantially free of acetone.

According to still other embodiments, the composite structure formed according to the forming method 200 may have a minimal content of acetone. For purposes of embodiments described herein, acetone content of the composite article can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the acetone content of the composite article may be not greater than about 0.2 ppm. According still other embodiments, the composite article may be substantially free of acetone.

According to still other embodiments, the intersection region between the silicone component and the plastic component of the composite structure formed according to the forming method 200 may have a minimal content of methyl ethyl ketone (MEK). For purposes of embodiments described herein, the MEK content of the intersection region can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the MEK content of the intersection region may be not greater than about 0.2 ppm. According still other embodiments, the intersection region may be substantially free of MEK.

According to still other embodiments, the composite structure formed according to the forming method 200 may have a minimal content of MEK. For purposes of embodiments described herein, the MEK content of the composite article can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the MEK content of the composite article may be not greater than about 0.2 ppm. According still other embodiments, the composite article may be substantially free of MEK.

According to still other embodiments, the intersection region between the silicone component and the plastic component of the composite structure formed according to the forming method 200 may have a minimal content of trimethylsilanol. For purposes of embodiments described herein, the trimethylsilanol content of the intersection region can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the trimethylsilanol content of the intersection region may be not greater than about 0.2 ppm. According still other embodiments, the intersection region may be substantially free of trimethylsilanol.

According to still other embodiments, the composite structure formed according to the forming method 200 may have a minimal content of trimethylsilanol. For purposes of embodiments described herein, the trimethylsilanol content of the composite article can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the trimethylsilanol content of the composite article may be not greater than about 0.2 ppm. According still other embodiments, the composite article may be substantially free of trimethylsilanol.

According to yet other embodiments, the composite structure formed according to the forming method 200 may have a particular thickness. For example, the composite structure may have an average thickness of at least about 2 mils, such as, at least about 3 mils or at least about 4 mils or at least about 5 mils or at least about 6 mils or at least about 7 mils or at least about 8 mils or at least about 9 mils or even at least about 10 mils. According to yet other embodiments, the composite structure may have an average thickness of not greater than about 500 mils. It will be appreciated that the thickness of the composite structure may be within a range between any of the minimum and maximum values noted above. It will be further appreciated that the thickness of the composite structure may be any value between any of the minimum and maximum values noted above.

According to yet other embodiments, the silicone component of the composite structure formed according to the forming method 200 may have a particular thickness. For example, the silicone component may have an average thickness of at least about 0.1 mils, such as, at least about 0.2 mils or at least about 0.5 mils or at least about 1.0 mils or at least about 2.0 mils or at least about 3.0 mils or at least about 4.0 mils or even at least about 5.0 mils. According to yet other embodiments, the silicone component may have an average thickness of not greater than about 250 mils. It will be appreciated that the thickness of the silicone component may be within a range between any of the minimum and maximum values noted above. It will be further appreciated that the thickness of the silicone component may be any value between any of the minimum and maximum values noted above.

According to yet other embodiments, the plastic component of the composite structure formed according to the forming method 200 may have a particular thickness. For example, the plastic component may have an average thickness of at least about 0.1 mils, such as, at least about 0.2 mils or at least about 0.5 mils or at least about 1.0 mils or at least about 2.0 mils or at least about 3.0 mils or at least about 4.0 mils or even at least about 5.0 mils. According to yet other embodiments, the plastic component may have an average thickness of not greater than about 250 mils. It will be appreciated that the thickness of the plastic component may be within a range between any of the minimum and maximum values noted above. It will be further appreciated that the thickness of the plastic component may be any value between any of the minimum and maximum values noted above.

Figure 3:
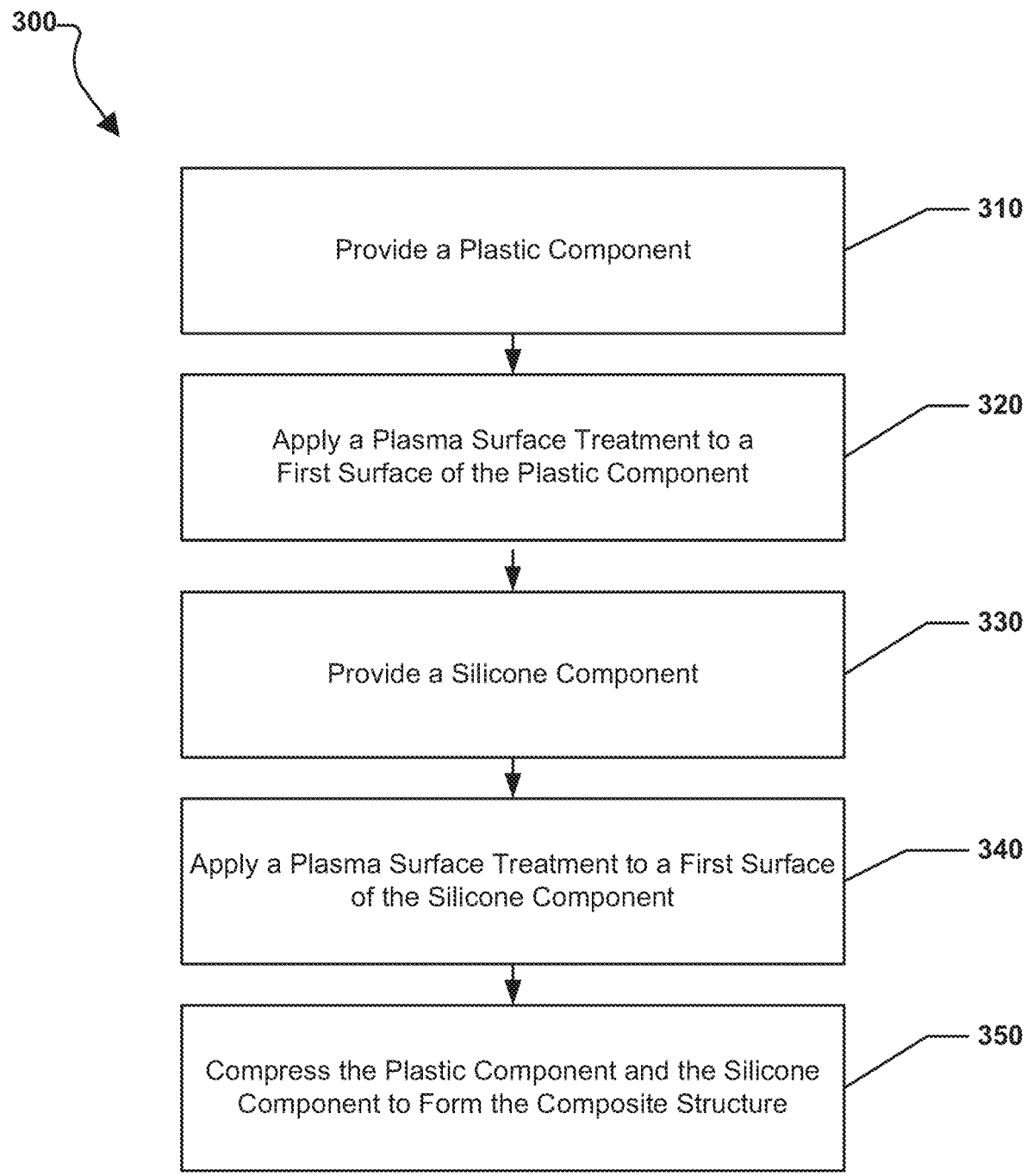
FIG. 3 includes a flow chart showing another method for forming a composite structure according to embodiments described herein.

Referring to yet another method of forming a composite article as described herein, FIG. 3 includes a diagram showing a forming method 300 according to embodiments described herein for forming a composite article. According to particular embodiments, the forming method 300 may include a first step 310 of providing a plastic component, a second step 320 of applying a plasma surface treatment to a first surface of the plastic component, a third step 330 of providing a silicone component, a fourth step 340 of applying a plasma surface treatment to a first surface of the silicone component, and a fifth step 350 of compressing the plastic component and the silicone component together to form the composite structure where the first surface of the plastic component contacts a first surface of the silicone component.

According to particular embodiments, the first step 310 of providing the plastic component may include any particular method of forming a plastic component. For example, the first step 310 of providing the plastic component may include extruding the plastic component. According to still other embodiments, the first step 310 of providing the plastic component may include molding the plastic component.

According to certain embodiments, the plastic component provided in the first step 310 may include a particular material. For example, the plastic component may include a polyolefin. According to still other embodiments, the plastic component may include a polypropylene material. According to yet other embodiments, the plastic component may include a polyethylene terephthalate (PET) material. According to yet other embodiments, the plastic component may include a poly(methyl methacrylate) (PMMA) material. According to still other embodiments, the plastic component may include any combination of a polypropylene material, a PET material, and a PMMA material. According to certain embodiments, the plastic component may consist of a particular material. For example, the plastic component may consist of a polyolefin. According to still other embodiments, the plastic component may consist of a polypropylene material. According to yet other embodiments, the plastic component may consist of a polyethylene terephthalate (PET) material. According to yet other embodiments, the plastic component may consist of a poly(methyl methacrylate) (PMMA) material. According to still other embodiments, the plastic component may consist of any combination of a polypropylene material, a PET material, and a PMMA material.

According to certain embodiments, the plastic component provided in the first step 310 may include a particular fluoropolymer material. For example, the plastic component may include a fluorinated ethylene propylene (FEP) material. According to yet other embodiments, the plastic component may include a polytetrafluoroethylene (PTFE) material. According to still other embodiments, the plastic component may include any combination of a fluoropolymer material, a FEP material, and a PTFE material. According to certain embodiments, the plastic component may consist of a particular fluoropolymer material. For example, the plastic component may consist of a fluorinated ethylene propylene (FEP) material. According to yet other embodiments, the plastic component may consist of a polytetrafluoroethylene (PTFE) material. According to still other embodiments, the plastic component may consist of any combination of a fluoropolymer material, a FEP material, and a PTFE material.

According to still other embodiments, the plastic component provided in the first step 310 may include a polycarbonate material. According to yet other embodiments, the plastic component may consist of a polycarbonate.

According to other particular embodiments, the second step 320 of applying the plasma surface treatment to a first surface of the plastic component may include applying a plasma configured to activate, or reactivate, functional groups on the first surface of the plastic component.

According to still other embodiments, the second step 320 of applying the plasma surface treatment may include applying a plasma for a particular duration. For example, the second step 320 of applying the plasma surface treatment may include applying a plasma for a duration of not greater than about 5 min or not greater than about 1 min or not greater than about 30 seconds of not greater than about 15 seconds or not greater than about 10 seconds or not greater than about 5 seconds. It will be appreciated that the second step 320 of applying the plasma surface treatment may include applying a plasma for a duration within a range between any of the values noted above. It will be further appreciated that the second step 320 of applying the plasma surface treatment may include applying a plasma for a duration of any value between any of the values noted above.

According to still other embodiments, the third step 330 of providing the silicone component may include any particular method of forming the silicone component. For example, the third step 330 of providing the silicone component may include extruding the silicone component. According to still other embodiments, the third step 330 of providing a silicone component may include molding the silicone component.

According to other particular embodiments, the fourth step 340 of applying the plasma surface treatment to a first surface of the silicone component may include applying a plasma configured to activate, or reactivate, functional groups on the first surface of the silicone component.

According to still other embodiments, the fourth step 340 of applying the plasma surface treatment may include applying a plasma for a particular duration. For example, the fourth step 340 of applying the plasma surface treatment may include applying a plasma for a duration of not greater than about 5 min or not greater than about 1 min or not greater than about 30 seconds of not greater than about 15 seconds or not greater than about 10 seconds or not greater than about 5 seconds. It will be appreciated that the fourth step 340 of applying the plasma surface treatment may include applying the plasma for a duration within a range between any of the values noted above. It will be further appreciated that the fourth step 340 of applying the plasma surface treatment may include applying the plasma for a duration of any value between any of the values noted above.

According to yet other embodiments, the fifth step 350 of compressing the plastic component and the silicone component together may occur within a particular time period after the plasma surface treatment of to the first surface of the plastic component. For example, compression of the plastic component and the silicone component together may occur not greater than about 30 seconds after the plasma surface treatment to the first surface of the plastic component, such as, not greater than about 25 seconds after the plasma surface treatment to the first surface of the plastic component or not greater than about 20 seconds after the plasma surface treatment to the first surface of the plastic component or not greater than about 15 seconds after the plasma surface treatment to the first surface of the plastic component or not greater than about 10 seconds after the plasma surface treatment to the first surface of the plastic component or even not greater than about 5 seconds after the plasma surface treatment to the first surface of the plastic component. It will be appreciated that the fifth step 350 of compressing the plastic component and the silicone component together may occur within a range between any of the values noted above. It will be further appreciated that the fifth step 350 of compressing the plastic component and the silicone component together may occur between any of the values noted above.

Referring now to the composite structure formed according to the forming method 300, the composite structure may include a plastic component, and a silicone component bonded to the plastic component at an intersecting region between a first surface of the plastic component and a first surface of the silicone component.

According to certain embodiments, the plastic component of the composite structure formed according to the forming method 300 may include a particular material. For example, the plastic component may include a polyolefin. According to still other embodiments, the plastic component may include a polypropylene material. According to yet other embodiments, the plastic component may include a polyethylene terephthalate (PET) material. According to yet other embodiments, the plastic component may include a poly(methyl methacrylate) (PMMA) material. According to still other embodiments, the plastic component may include any combination of a polypropylene material, a PET material, and a PMMA material. According to certain embodiments, the plastic component may consist of a particular material. For example, the plastic component may consist of a polyolefin. According to still other embodiments, the plastic component may consist of a polypropylene material. According to yet other embodiments, the plastic component may consist of a polyethylene terephthalate (PET) material. According to yet other embodiments, the plastic component may consist of a poly(methyl methacrylate) (PMMA) material. According to still other embodiments, the plastic component may consist of any combination of a polypropylene material, a PET material, and a PMMA material.

According to certain embodiments, the plastic component of the composite structure formed according to the forming method 300 may include a particular material. For example, the plastic component may include a fluorinated ethylene propylene (FEP) material. According to yet other embodiments, the plastic component may include a polytetrafluoroethylene (PTFE) material. According to still other embodiments, the plastic component may include any combination of a fluoropolymer material, a FEP material, and a PTFE material. According to certain embodiments, the plastic component may consist of a particular fluoropolymer material. For example, the plastic component may consist of a fluorinated ethylene propylene (FEP) material. According to yet other embodiments, the plastic component may consist of a polytetrafluoroethylene (PTFE) material. According to still other embodiments, the plastic component may consist of any combination of a fluoropolymer material, a FEP material, and a PTFE material.

According to still other embodiments, the plastic component of the composite structure formed according to the forming method 300 may include a particular material. According to yet other embodiments, the plastic component may consist of a polycarbonate.

According to yet other embodiments, the composite structure formed according to the forming method 300 may have a particular adhesion force between the silicone component and the plastic component. For purposes of embodiments described herein, adhesion force can be measured using ASTM D1876-08. According to certain embodiments, the adhesion force between the silicone component and the plastic component may be at least about 1 ppi, such as, at least about 5 ppi or at least about 15 ppi or even at least about 50 ppi. It will be appreciated that the adhesion force between the silicone component and the plastic component may be within a range between any of the values noted above. It will be further appreciated that the adhesion force between the silicone component and the plastic component may be any value between any of the values noted above.

According to still other embodiments, the intersection region between the silicone component and the plastic component of the composite structure formed according to the forming method 300 may have a minimal content of acetone. For purposes of embodiments described herein, acetone content of the intersection region can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the acetone content of the intersection region may be not greater than about 0.2 ppm. According still other embodiments, the intersection region may be substantially free of acetone.

According to still other embodiments, the composite structure formed according to the forming method 300 may have a minimal content of acetone. For purposes of embodiments described herein, acetone content of the composite article can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the acetone content of the composite article may be not greater than about 0.2 ppm. According still other embodiments, the composite article may be substantially free of acetone.

According to still other embodiments, the intersection region between the silicone component and the plastic component of the composite structure formed according to the forming method 300 may have a minimal content of methyl ethyl ketone (MEK). For purposes of embodiments described herein, the MEK content of the intersection region can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the MEK content of the intersection region may be not greater than about 0.2 ppm. According still other embodiments, the intersection region may be substantially free of MEK.

According to still other embodiments, the composite structure formed according to the forming method 300 may have a minimal content of MEK. For purposes of embodiments described herein, the MEK content of the composite article can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the MEK content of the composite article may be not greater than about 0.2 ppm. According still other embodiments, the composite article may be substantially free of MEK.

According to still other embodiments, the intersection region between the silicone component and the plastic component of the composite structure formed according to the forming method 300 may have a minimal content of trimethylsilanol. For purposes of embodiments described herein, the trimethylsilanol content of the intersection region can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the trimethylsilanol content of the intersection region may be not greater than about 0.2 ppm. According still other embodiments, the intersection region may be substantially free of trimethylsilanol.

According to still other embodiments, the composite structure formed according to the forming method 300 may have a minimal content of trimethylsilanol. For purposes of embodiments described herein, the trimethylsilanol content of the composite article can be measured using a testing method where a representative laminate is isolated and incubated in a heat oven at a temperature of 120° C. for 6 hours. The ratio of the laminated surface to the volume of the oven is within a range of between 0.5 to 2 $cm^2/cm^3$. The gas emitted during the heating is collected and tested using an analytical system of a Nutech 8900DS preconcentrator paired with an Agilent 6890 gas chromatograph (GC) coupled with an Agilent 5973 mass selective (MS) detector. A calibration curve with at least five points is generated by analyzing a primary standard with a known concentration of contaminate being measured (i.e., 0.1 ppm, 0.3 ppm, 0.5 ppm, 0.7 ppm and 1 ppm). According to certain embodiments, the trimethylsilanol content of the composite article may be not greater than about 0.2 ppm. According still other embodiments, the composite article may be substantially free of trimethylsilanol.

According to yet other embodiments, the composite structure formed according to the forming method 300 may have a particular thickness. For example, the composite structure may have an average thickness of at least about 2 mils, such as, at least about 3 mils or at least about 4 mils or at least about 5 mils or at least about 6 mils or at least about 7 mils or at least about 8 mils or at least about 9 mils or even at least about 10 mils. According to yet other embodiments, the composite structure may have an average thickness of not greater than about 500 mils. It will be appreciated that the thickness of the composite structure may be within a range between any of the minimum and maximum values noted above. It will be further appreciated that the thickness of the composite structure may be any value between any of the minimum and maximum values noted above.

According to yet other embodiments, the silicone component of the composite structure formed according to the forming method 300 may have a particular thickness. For example, the silicone component may have an average thickness of at least about 0.1 mils, such as, at least about 0.2 mils or at least about 0.5 mils or at least about 1.0 mils or at least about 2.0 mils or at least about 3.0 mils or at least about 4.0 mils or even at least about 5.0 mils. According to yet other embodiments, the silicone component may have an average thickness of not greater than about 250 mils. It will be appreciated that the thickness of the silicone component may be within a range between any of the minimum and maximum values noted above. It will be further appreciated that the thickness of the silicone component may be any value between any of the minimum and maximum values noted above.

According to yet other embodiments, the plastic component of the composite structure formed according to the forming method 300 may have a particular thickness. For example, the plastic component may have an average thickness of at least about 0.1 mils, such as, at least about 0.2 mils or at least about 0.5 mils or at least about 1.0 mils or at least about 2.0 mils or at least about 3.0 mils or at least about 4.0 mils or even at least about 5.0 mils. According to yet other embodiments, the plastic component may have an average thickness of not greater than about 250 mils. It will be appreciated that the thickness of the plastic component may be within a range between any of the minimum and maximum values noted above. It will be further appreciated that the thickness of the plastic component may be any value between any of the minimum and maximum values noted above.

According to still other embodiments, the composite structure may be any desirable component. For example, the composite structure may be a septa. According to yet other embodiments, the composite structure may be a liner.

Figure 4:
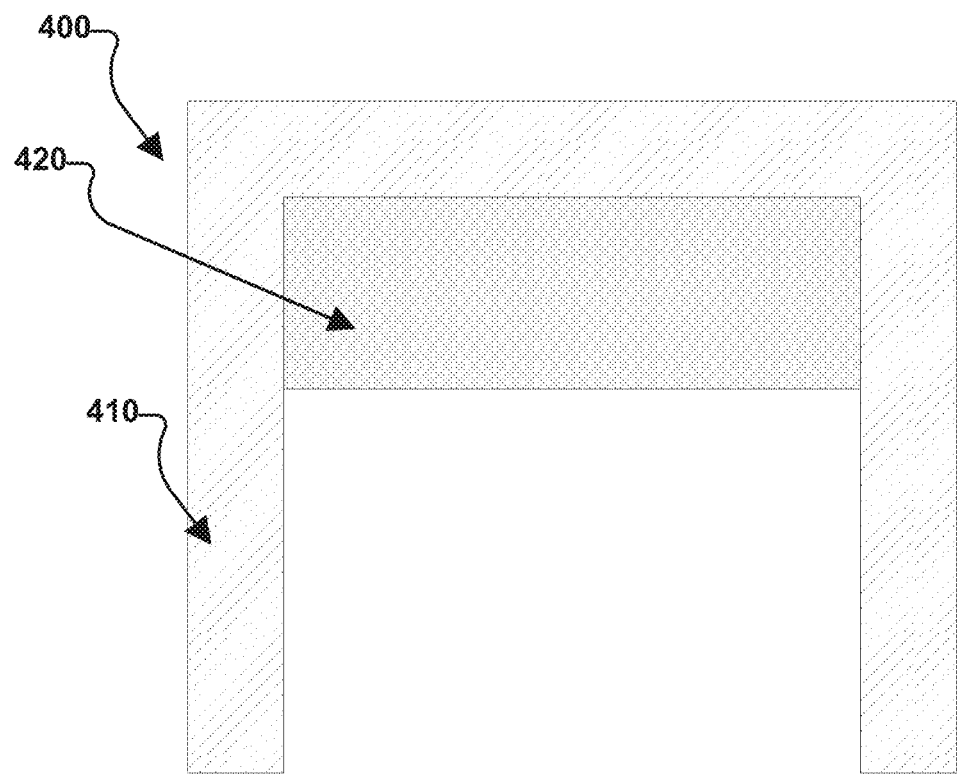
FIG. 4 includes an illustration showing a diagram of a example composite structure (i.e. a septa) according to embodiments described herein.

For purposes of illustration, FIG. 4 includes an illustration showing a diagram of a septa according to embodiments described herein. As shown in FIG. 4, a septa may include a cap 410 (i.e., a plastic component) and a silicone component 420 attached to the cap 410. It will be appreciated that cap 410 may have any of the characteristics described herein with regard to any plastic component. It will be further appreciated that the silicone component 420 may have any of the characteristics described herein with regard to any silicone component.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A method for forming a composite structure, wherein the method comprises: providing a plastic component; applying a plasma surface treatment to a first surface of the plastic component; providing a silicone component; and compressing the plastic component and the silicone component together to form the composite structure, wherein the first surface of the plastic component contacts a first surface of the silicone component.

Embodiment 2. The method of embodiment 1, wherein providing the plastic component comprises extruding the plastic component, wherein providing the plastic component comprises molding the plastic component.

Embodiment 3. The method of embodiment 1, wherein applying the plasma surface treatment to the first surface of the plastic component comprises applying a plasma configured to activate or reactivate functional groups on the first surface of the plastic component.

Embodiment 4. The method of embodiment 1, wherein applying the plasma surface treatment to the first surface of the plastic component comprises applying a plasma for a duration of not greater than about 5 min or not greater than about 1 min or not greater than about 30 seconds of not greater than about 15 seconds or not greater than about 10 seconds or not greater than about 5 seconds.

Embodiment 5. The method of embodiment 1, wherein providing the silicone component comprises extruding the silicone component, wherein providing the silicone component comprises molding the silicone component.

Embodiment 6. The method of embodiment 1, wherein compressing the silicone component and plastic component together occurs not greater than about 30 seconds after the plasma surface treatment to the first surface of the plastic component or not greater than about 25 seconds or not greater than about 20 seconds or not greater than about 15 seconds or not greater than about 10 seconds or not greater than about 5 seconds.

Embodiment 7. The method of embodiment 1, wherein the plastic component comprises a polyolefin, such as, polypropylene, PET, PMMA, or any combination thereof.

Embodiment 8. The method of embodiment 1, wherein the plastic component comprises a fluoropolymer, such as, FEP, PTFE, or any combination thereof.

Embodiment 9. The method of embodiment 1, wherein the plastic component comprises a polycarbonate.

Embodiment 10. The method of embodiment 1, wherein the composite structure comprises an adhesion force between the silicone component and the plastic component of at least about 1 ppi or at least about 5 ppi or at least about 15 ppi or at least about 50 ppi.

Embodiment 11. The method of embodiment 1, wherein the composite structure comprises an intersecting region between the silicone component and the plastic component.

Embodiment 12. The method of embodiment 11, wherein the intersecting region comprises an acetone content of not greater than about 0.2 ppm or is be substantially free of acetone.

Embodiment 13. The method of embodiment 1, wherein the composite structure comprises an acetone content of not greater than about 0.2 ppm or is be substantially free of acetone.

Embodiment 14. The method of embodiment 11, wherein the intersecting region comprises an MEK content of not greater than about 0.2 ppm or is be substantially free of MEK.

Embodiment 15. The method of embodiment 1, wherein the composite structure comprises an MEK content of not greater than about 0.2 ppm or is be substantially free of MEK.

Embodiment 16. The method of embodiment 11, wherein the intersecting region comprises a trimethylsilanol content of not greater than about 0.2 ppm or is be substantially free of trimethylsilanol.

Embodiment 17. The method of embodiment 1, wherein the composite structure comprises a trimethylsilanol content of not greater than about 0.2 ppm or is be substantially free of trimethylsilanol.

Embodiment 18. The method of embodiment 1, wherein the composite structure comprises an average thickness of at least about 2 mils or at least about 3 mils or at least about 4 mils or at least about 5 mils or at least about 6 mils or at least about 7 mils or at least about 8 mils or at least about 9 mils or at least about 10 mils.

Embodiment 19. The method of embodiment 1, wherein the composite structure comprises an average thickness of not greater than about 500 mils.

Embodiment 20. The method of embodiment 1, wherein the silicone component comprises an average thickness of at least about 0.1 mils or at least about 0.2 mils or at least about 0.5 mils or at least about 1.0 mils or at least about 2.0 mils or at least about 3.0 mils or at least about 4.0 mils or at least about 5.0 mils.

Embodiment 21. The method of embodiment 1, wherein the silicone component comprises an average thickness of not greater than about 250 mils.

Embodiment 22. The method of embodiment 1, wherein the plastic component comprises an average thickness of at least about 0.1 mils or at least about 0.2 mils or at least about 0.5 mils or at least about 1.0 mils or at least about 2.0 mils or at least about 3.0 mils or at least about 4.0 mils or at least about 5.0 mils.

Embodiment 23. The method of embodiment 1, wherein the plastic component comprises an average thickness of not greater than about 250 mils.

Embodiment 24. A method for forming a composite structure, wherein the method comprises: providing a plastic component; providing a silicone component; applying a plasma surface treatment to a first surface of the silicone component; and compressing the plastic component and the silicone component together to form the composite structure, wherein a first surface of the plastic component contacts the first surface of the silicone component.

Embodiment 25. The method of embodiment 24, wherein providing the plastic component comprises extruding the plastic component, wherein providing the plastic component comprises molding the silicone component.

Embodiment 26. The method of embodiment 24, wherein providing the silicone component comprises extruding the silicone component, wherein providing the silicone component comprises molding the silicone component.

Embodiment 27. The method of embodiment 24, wherein applying the plasma surface treatment to the first surface of the silicone component comprises applying a plasma configured to activate or reactivate functional groups on the first surface of the silicone component.

Embodiment 28. The method of embodiment 24, wherein applying the plasma surface treatment to the first surface of the silicone component comprises applying a plasma for a duration of not greater than 5 min or not greater than about 1 min or not greater than about 30 seconds of not greater than about 15 seconds or not greater than about 10 seconds or not greater than about 5 seconds.

Embodiment 29. The method of embodiment 24, wherein compressing the silicone component and plastic component together occurs not greater than about 30 seconds after the plasma surface treatment to the first surface of the plastic component or not greater than about 25 seconds or not greater than about 20 seconds or not greater than about 15 seconds or not greater than about 10 seconds or not greater than about 5 seconds.

Embodiment 30. The method of embodiment 24, wherein the plastic component comprises a polyolefin, such as, polypropylene, PET, PMMA, or any combination thereof.

Embodiment 31. The method of embodiment 24, wherein the plastic component comprises a fluoropolymer, such as, FEP, PTFE, or any combination thereof.

Embodiment 32. The method of embodiment 24, wherein the plastic component comprises a polycarbonate.

Embodiment 33. The method of embodiment 24, wherein the composite structure comprises an adhesion force between the silicone component and the plastic component of at least about 1 ppi or at least about 5 ppi or at least about 15 ppi or at least about 50 ppi.

Embodiment 34. The method of embodiment 24, wherein the composite structure comprises an intersecting region between the silicone component and the plastic component.

Embodiment 35. The method of embodiment 34, wherein the intersecting region comprises an acetone content of not greater than about 0.2 ppm or is be substantially free of acetone.

Embodiment 36. The method of embodiment 24, wherein the composite structure comprises an acetone content of not greater than about 0.2 ppm or is be substantially free of acetone.

Embodiment 37. The method of embodiment 34, wherein the intersecting region comprises an MEK content of not greater than about 0.2 ppm or is be substantially free of MEK.

Embodiment 38. The method of embodiment 24, wherein the composite structure comprises an MEK content of not greater than about 0.2 ppm or is be substantially free of MEK.

Embodiment 39. The method of embodiment 34, wherein the intersecting region comprises a trimethylsilanol content of not greater than about 0.2 ppm or is be substantially free of trimethylsilanol.

Embodiment 40. The method of embodiment 24, wherein the composite structure comprises a trimethylsilanol content of not greater than about 0.2 ppm or is be substantially free of trimethylsilanol.

Embodiment 41. The method of embodiment 24, wherein the composite structure comprises an average thickness of at least about 2 mils or at least about 3 mils or at least about 4 mils or at least about 5 mils or at least about 6 mils or at least about 7 mils or at least about 8 mils or at least about 9 mils or at least about 10 mils.

Embodiment 42. The method of embodiment 24, wherein the composite structure comprises an average thickness of not greater than about 500 mils.

Embodiment 43. The method of embodiment 24, wherein the silicone component comprises an average thickness of at least about 0.1 mils or at least about 0.2 mils or at least about 0.5 mils or at least about 1.0 mils or at least about 2.0 mils or at least about 3.0 mils or at least about 4.0 mils or at least about 5.0 mils.

Embodiment 44. The method of embodiment 24, wherein the silicone component comprises an average thickness of not greater than about 250 mils.

Embodiment 45. The method of embodiment 24, wherein the plastic component comprises an average thickness of at least about 0.1 mils or at least about 0.2 mils or at least about 0.5 mils or at least about 1.0 mils or at least about 2.0 mils or at least about 3.0 mils or at least about 4.0 mils or at least about 5.0 mils.

Embodiment 46. The method of embodiment 24, wherein the plastic component comprises an average thickness of not greater than about 250 mils.

Embodiment 47. A method for forming a composite structure, wherein the method comprises: providing a plastic component; applying a plasma surface treatment to a first surface of the plastic component; providing a silicone component; applying a plasma surface treatment to a first surface of the silicone component; and compressing the plastic component and the silicone component together to form the composite structure, wherein the first surface of the plastic component contacts the first surface of the silicone component.

Embodiment 48. The method of embodiment 47, wherein providing the plastic component comprises extruding the plastic component, wherein providing the plastic component comprises molding the silicone component.

Embodiment 49. The method of embodiment 47, wherein applying the plasma surface treatment to the first surface of the plastic component comprises applying a plasma configured to activate or reactivate functional groups on the first surface of the plastic component.

Embodiment 50. The method of embodiment 47, wherein applying the plasma surface treatment to the first surface of the plastic component comprises applying a plasma for a duration of not greater than 5 min or not greater than about 1 min or not greater than about 30 seconds of not greater than about 15 seconds or not greater than about 10 seconds or not greater than about 5 seconds.

Embodiment 51. The method of embodiment 47, wherein providing the silicone component comprises extruding the silicone component, wherein providing the silicone component comprises molding the silicone component.

Embodiment 52. The method of embodiment 47, wherein applying the plasma surface treatment to the first surface of the silicone component comprises applying a plasma configured to activate or reactivate functional groups on the first surface of the plastic component.

Embodiment 53. The method of embodiment 47, wherein applying the plasma surface treatment to the first surface of the silicone component comprises applying a plasma for a duration of not greater than 5 min or not greater than about 1 min or not greater than about 30 seconds of not greater than about 15 seconds or not greater than about 10 seconds or not greater than about 5 seconds.

Embodiment 54. The method of embodiment 47, wherein compressing the silicone component and plastic component together occurs not greater than about 30 seconds after the plasma surface treatment to the first surface of the plastic component and the plasma surface treatment to the first surface of the silicone component or not greater than about 25 seconds or not greater than about 20 seconds or not greater than about 15 seconds or not greater than about 10 seconds or not greater than about 5 seconds.

Embodiment 55. The method of embodiment 47, wherein the plastic component comprises a polyolefin, such as, polypropylene, PET, PMMA, or any combination thereof.

Embodiment 56. The method of embodiment 47, wherein the plastic component comprises a fluoropolymer, such as, FEP, PTFE, or any combination thereof.

Embodiment 57. The method of embodiment 47, wherein the plastic component comprises a polycarbonate.

Embodiment 58. The method of embodiment 47, wherein the composite structure comprises an adhesion force between the silicone component and the plastic component of at least about 1 ppi or at least about 5 ppi or at least about 15 ppi or at least about 50 ppi.

Embodiment 59. The method of embodiment 47, wherein the composite structure comprises an intersecting region between the silicone component and the plastic component.

Embodiment 60. The method of embodiment 59, wherein the intersecting region comprises an acetone content of not greater than about 0.2 ppm or is be substantially free of acetone.

Embodiment 61. The method of embodiment 47, wherein the composite structure comprises an acetone content of not greater than about 0.2 ppm or is be substantially free of acetone.

Embodiment 62. The method of embodiment 59, wherein the intersecting region comprises an MEK content of not greater than about 0.2 ppm or is be substantially free of MEK.

Embodiment 63. The method of embodiment 47, wherein the composite structure comprises an MEK content of not greater than about 0.2 ppm or is be substantially free of MEK.

Embodiment 64. The method of embodiment 59, wherein the intersecting region comprises a trimethylsilanol content of not greater than about 0.2 ppm or is be substantially free of trimethylsilanol.

Embodiment 65. The method of embodiment 47, wherein the composite structure comprises a trimethylsilanol content of not greater than about 0.2 ppm or is be substantially free of trimethylsilanol.

Embodiment 66. The method of embodiment 47, wherein the composite structure comprises an average thickness of at least about 2 mils or at least about 3 mils or at least about 4 mils or at least about 5 mils or at least about 6 mils or at least about 7 mils or at least about 8 mils or at least about 9 mils or at least about 10 mils.

Embodiment 67. The method of embodiment 47, wherein the composite structure comprises an average thickness of not greater than about 500 mils.

Embodiment 68. The method of embodiment 47, wherein the silicone component comprises an average thickness of at least about 0.1 mils or at least about 0.2 mils or at least about 0.5 mils or at least about 1.0 mils or at least about 2.0 mils or at least about 3.0 mils or at least about 4.0 mils or at least about 5.0 mils.

Embodiment 69. The method of embodiment 47, wherein the silicone component comprises an average thickness of not greater than about 250 mils.

Embodiment 70. The method of embodiment 47, wherein the plastic component comprises an average thickness of at least about 0.1 mils or at least about 0.2 mils or at least about 0.5 mils or at least about 1.0 mils or at least about 2.0 mils or at least about 3.0 mils or at least about 4.0 mils or at least about 5.0 mils.

Embodiment 71. The method of embodiment 47, wherein the plastic component comprises an average thickness of not greater than about 250 mils.

Embodiment 72. A composite structure comprising a plastic component, and a silicone component bonded to the plastic component at an intersecting region between a first surface of the plastic component and a first surface of the silicone component, wherein the intersecting region comprises at least one of: an acetone content of not greater than about 0.2 ppm or no acetone content; an MEK content of not greater than about 0.2 ppm or no MEK content; or a trimethylsilanol content of not greater than about 0.2 ppm or no trimethylsilanol content.

Embodiment 73. The composite structure of embodiment 72, wherein the plastic component comprises a polyolefin, such as, polypropylene, PET, PMMA, or any combination thereof.

Embodiment 74. The composite structure of embodiment 72, wherein the plastic component comprises a fluoropolymer, such as, FEP, PTFE, or any combination thereof.

Embodiment 75. The composite structure of embodiment 72, wherein the plastic component comprises a polycarbonate.

Embodiment 76. The composite structure of embodiment 72, wherein the composite structure comprises an adhesion force between the silicone component and the plastic component of at least about 1 ppi or at least about 5 ppi or at least about 15 ppi or at least about 50 ppi.

Embodiment 77. The composite structure of embodiment 72, wherein the intersecting region comprises an acetone content of not greater than about 0.2 ppm or is be substantially free of acetone.

Embodiment 78. The composite structure of embodiment 72, wherein the composite structure comprises an acetone content of not greater than about 0.2 ppm or is be substantially free of acetone.

Embodiment 79. The composite structure of embodiment 72, wherein the intersecting region comprises an MEK content of not greater than about 0.2 ppm or is be substantially free of MEK Embodiment 80. The composite structure of embodiment 72, wherein the composite structure comprises an MEK content of not greater than about 0.2 ppm or is be substantially free of MEK Embodiment 81. The composite structure of embodiment 72, wherein the intersecting region comprises a trimethylsilanol content of not greater than about 0.2 ppm or is be substantially free of trimethylsilanol.

Embodiment 82. The composite structure of embodiment 72, wherein the composite structure comprises a trimethylsilanol content of not greater than about 0.2 ppm or is be substantially free of trimethylsilanol.

Embodiment 83. The composite structure of embodiment 72, wherein the composite structure comprises an average thickness of at least about 2 mils or at least about 3 mils or at least about 4 mils or at least about 5 mils or at least about 6 mils or at least about 7 mils or at least about 8 mils or at least about 9 mils or at least about 10 mils.

Embodiment 84. The composite structure of embodiment 72, wherein the composite structure comprises a total thickness of not greater than about 500 mils.

Embodiment 85. The composite structure of embodiment 72, wherein the silicone component comprises an average thickness of at least about 0.1 mils or at least about 0.2 mils or at least about 0.5 mils or at least about 1.0 mils or at least about 2.0 mils or at least about 3.0 mils or at least about 4.0 mils or at least about 5.0 mils.

Embodiment 86. The composite structure of embodiment 72, wherein the silicone component comprises an average thickness of not greater than about 250 mils.

Embodiment 87. The composite structure of embodiment 72, wherein the plastic component comprises an average thickness of at least about 0.1 mils or at least about 0.2 mils or at least about 0.5 mils or at least about 1.0 mils or at least about 2.0 mils or at least about 3.0 mils or at least about 4.0 mils or at least about 5.0 mils.

Embodiment 88. The composite structure of embodiment 72, wherein the plastic component comprises an average thickness of not greater than about 250 mils.

Embodiment 89. The composite structure of any one of embodiments 72-88, wherein the composite structure is in the form of a septa, a liner.

Embodiment 90. A composite structure according to any of embodiments 72-89 made by the method of any of embodiments 1-71.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A method for forming a composite structure, wherein the method comprises:
   providing a plastic component;
   applying a plasma surface treatment to a first surface of the plastic component;
   providing a silicone component;
   applying a plasma surface treatment to a first surface of the silicone component; and
   compressing the plastic component and the silicone component together to form the composite structure, wherein the first surface of the plastic component contacts a first surface of the silicone component, wherein compressing the silicone component and plastic component together occurs not greater than about 30 seconds after the plasma surface treatment to the first surface of the plastic component.

2. The method of claim 1, wherein providing the plastic component comprises extruding the plastic component, wherein providing the plastic component comprises molding the plastic component.

3. The method of claim 1, wherein applying the plasma surface treatment to the first surface of the plastic component comprises applying a plasma configured to activate or reactivate functional groups on the first surface of the plastic component.

4. The method of claim 1, wherein providing the silicone component comprises extruding the silicone component, wherein providing the silicone component comprises molding the silicone component.

5. The method of claim 1, wherein the plastic component comprises a polyolefin.

6. The method of claim 1, wherein the plastic component comprises a fluoropolymer.

7. The method of claim 1, wherein the plastic component comprises a polycarbonate.

8. The method of claim 1, wherein the composite structure comprises an intersecting region between the silicone component and the plastic component.

9. The method of claim 1, wherein the composite structure comprises an acetone content of not greater than about 0.2 ppm or is be substantially free of acetone.

10. The method of claim 1, wherein the composite structure comprises an adhesion force between the silicone component and the plastic component of at least about 1 ppi.

11. The method of claim 1, wherein applying the plasma surface treatment to the first surface of the plastic component comprises applying a plasma for a duration of not greater than about 5 min.

12. The method of claim 8, wherein the intersecting region comprises an MEK content of not greater than about 0.2 ppm.

13. The method of claim 8, wherein the intersecting region comprises a trimethylsilanol content of not greater than about 0.2 ppm.

14. The method of claim 1, wherein the composite structure comprises an average thickness of at least about 2 mils.

15. The method of claim 1, wherein the composite structure comprises an average thickness of not greater than about 500 mils.

16. A method for forming a composite structure, wherein the method comprises:
   providing a plastic component;
   providing a silicone component;
   applying a plasma surface treatment to a first surface of the silicone component; and
   compressing the plastic component and the silicone component together to form the composite structure, wherein a first surface of the plastic component contacts the first surface of the silicone component, wherein compressing the silicone component and plastic component together occurs not greater than about 30 seconds after the plasma surface treatment to the first surface of the plastic component.

17. The method of claim 16, wherein providing the plastic component comprises extruding the plastic component, wherein providing the plastic component comprises molding the silicone component.

18. The method of claim 16, wherein providing the silicone component comprises extruding the silicone component, wherein providing the silicone component comprises molding the silicone component.

19. The method of claim 16, wherein applying the plasma surface treatment to the first surface of the silicone component comprises applying a plasma configured to activate or reactivate functional groups on the first surface of the silicone component.

\* \* \* \* \*